J. LEHMANN.
HIGH SPEED TOOTH AND BLADE CUTTER.
APPLICATION FILED JUNE 23, 1908.

910,137.  Patented Jan. 19, 1909.

Witnesses
Frank B. Hoffman
R. M. Smith

Inventor
John Lehmann

By Victor J. Evans.
Attorney

UNITED STATES PATENT OFFICE.

JOHN LEHMANN, OF MUNCIE, INDIANA.

HIGH-SPEED TOOTH AND BLADE CUTTER.

No. 910,137.  Specification of Letters Patent.  Patented Jan. 19, 1909.

Application filed June 23, 1908. Serial No. 440,044.

*To all whom it may concern:*

Be it known that I, JOHN LEHMANN, a citizen of the United States, residing at Muncie, in the county of Delaware and State of Indiana, have invented new and useful Improvements in High-Speed Tooth and Blade Cutters, of which the following is a specification.

This invention relates to rotary (tooth and blade) cutter, the object of the invention being to provide a circular cutter adapted to be driven at a very high rate of speed for cutting teeth of different depths, widths, lengths and bevels in hot or cold steel in the formation of cutting tools especially adapted for operating on granite or other kinds of stone.

By means of the construction hereinafter described, single double or multiple teeth may be cut simultaneously by the action of the improved cutter.

With the above and other objects in view, the invention consists in the novel construction, combination and arrangement of parts as herein fully described, illustrated and claimed.

Figure 1:
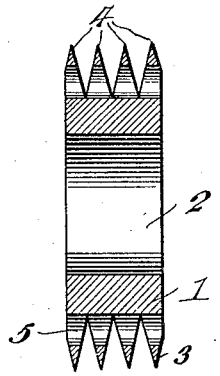
Figure 2:
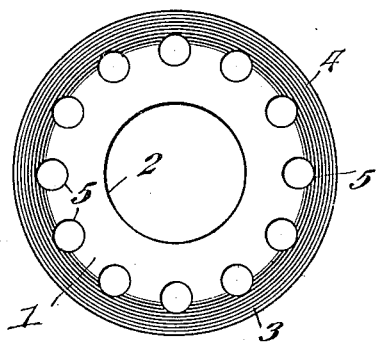
Figure 3:
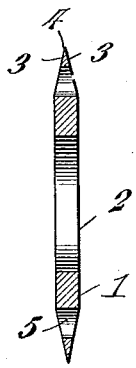
Figure 4:
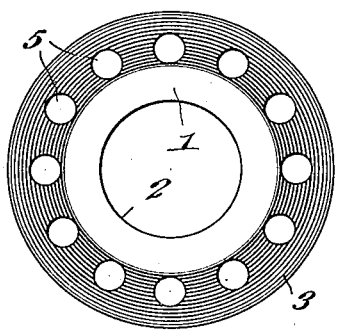

In the accompanying drawings:—Figure 1 is a diametrical section through a multiple edge cutter embodying the present invention. Fig. 2 is a plan view of the same. Fig. 3 is a diametrical section through a single cutter. Fig. 4 is a plan view thereof.

The cutter contemplated in this invention comprises a disk-shaped body 1 provided with a central opening 2 to adapt the same to be mounted and secured fast upon a rotary mandrel.

In carrying out the invention, the outer circular margin of the cutter is reversely beveled on its opposite sides as shown at 3 to produce a peripheral cutting edge 4 and a circular series of holes 5 are formed through the body of the cutter and preferably in the beveled outer margin thereof to provide for what is known as clearance, the said holes providing supplemental cutting or shearing edges which act to shear off portions of the metal during the rapid revolution of the cutter.

The cutter may consist of a single disk or body as shown in Fig. 3, or in other words a body having a single peripheral cutting edge or said body may be made relatively thicker as shown in Fig. 1 so as to provide for the formation of a plurality of peripheral cutting edges 4 thereby enabling a number of parallel teeth or blades to be formed by a single operation. The piece of tool steel or other metal of which the tool is to be formed is fed against the cutting edge or edges of the rapidly revolving cutter and held against the cutter with sufficient pressure to enable the edge or edges of the cutter to perform their work and while it is preferable to heat the tool steel before subjecting the same to the action of the cutter, the tool nevertheless may be cut without being heated although the operation will be somewhat slower.

It will be understood that the cutter may be provided with any desired number of cutting edges 4 or a composite cutter may be made up by securing any desired number of single cutters such as is shown in Fig. 3 upon the same mandrel.

The cutter as a whole is designed for producing tools such as are used for operating upon various kinds of stone.

I claim:—

1. A rotary disk-shaped cutter having the marginal edge thereof beveled to form a cutting edge, said cutter being provided with holes extending through the beveled portion thereof.

2. A rotary disk-shaped cutter embodying a plurality of beveled peripheral cutting edges and formed with holes extending transversely adjacent to the cutting edges.

In testimony whereof I affix my signature in presence of two witnesses.

JOHN LEHMANN.

Witnesses:
  WILLIAM T. RIBBLE,
  WILL P. KOONS.